(No Model.)
A. GÜNTHER.
PNEUMATIC TIRE.
No. 600,781. Patented Mar. 15, 1898.
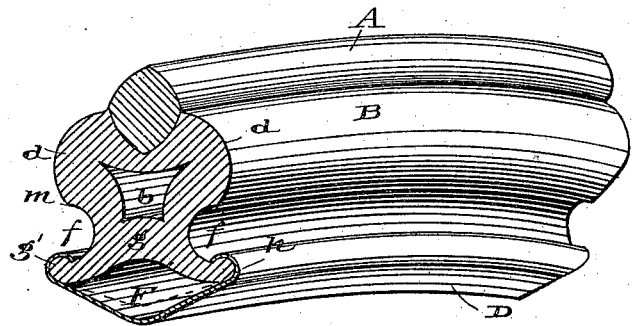
Fig. 1
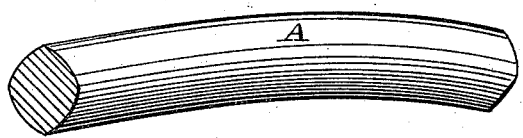
Fig. 3
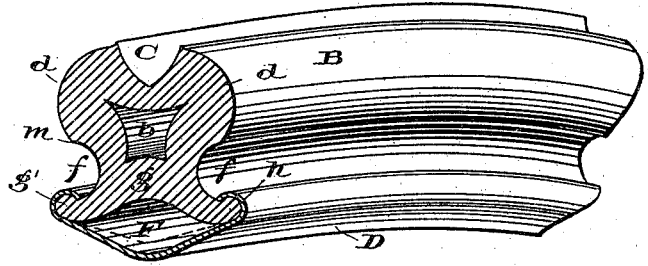
Fig. 2
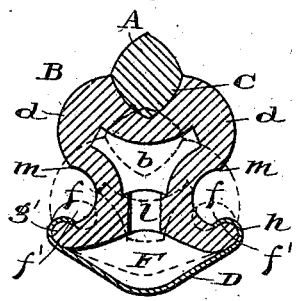
Fig. 5
Fig. 4
Witnesses:-
B. Krupp
C. H. Schafer
Inventor.
Adolf Günther
By his Atty.

UNITED STATES PATENT OFFICE.

ADOLF GÜNTHER, OF BERLIN, GERMANY, ASSIGNOR OF ONE-HALF TO RICHARD LINS, OF SAME PLACE.

PNEUMATIC TIRE.

SPECIFICATION forming part of Letters Patent No. 600,781, dated March 15, 1898.

Application filed May 5, 1897. Serial No. 635,162. (No model.)

*To all whom it may concern:*

Be it known that I, ADOLF GÜNTHER, engraver, a citizen of the Kingdom of Prussia, and a resident of Berlin, in the Kingdom of Prussia and German Empire, have invented certain new and useful Improvements in Vehicle-Rims and Pneumatic Tires, of which the following is a specification.

My invention relates to a wheel rim and tire which is devised especially for use with cycles and is made elastic by means of a hollow rubber body within which the air is compressed by means of the load carried by the vehicle.

The invention consists, primarily, in a novel construction of rubber tire-body for such wheels which, together with a wheel-rim especially adapted to receive and be securely attached to said body, will provide a wheel with an elastic and durable rim and tire which will stand a heavy load, and also in providing the said hollow rubber tire-body with a tread-ring especially adapted thereto, as will hereinafter appear.

In the accompanying drawings, which illustrate my invention, Figure 1 is a sectional perspective view of a portion of a wheel-tire embodying my invention with all of the parts in place; Fig. 2, a like view of a portion of the tire-body and wheel-rim with the tread-ring removed from the said body; Fig. 3, a like view of a portion of the rubber tread-ring in detail adapted to fit said body; Fig. 4, a transverse section of said ring and the seat in the body when the ring is embedded loosely therein; and Fig. 5, a transverse section through the hollow body, rim, and tread-ring, the latter being tightly embedded therein and the body formed in a special manner with channels upon the inner side thereof, the said body and tread-ring being shown by full lines in its position when unloaded and by dot-lines in position when heavily loaded.

The wheel-tread A comprises a solid rubber ring of rounded diamond-shaped cross-section fitted into a groove C in the outer side of a hollow or tubular rubber body B, the latter being of form of cross-section, as will hereinafter appear, and supported upon the sheet-metal rim D of the wheel. The rim D is of gutter-shaped cross-section and is provided at its side margins with curled flanges $h$ to receive the side flanges of tire $g'$ of the base $g$ of said tire-body, the said tire $g'$ being of bead shape to closely fit within the curled metal flanges to form an air-tight connection therewith, and the said base $g$ is arched with a bow-shaped cross-section to cross over the rim from flange to flange thereof and thus provide a closed supplemental air-chamber F below the hollow body of the tire, as clearly shown in Figs. 1, 2, and 5, the hollow chamber $b$ thereof being for some purposes, where, for instance, a heavy load is carried, preferably closed completely, and for other purposes, where a greater degree of elasticity of tire is required, the main air-chamber $b$ is connected by channels $l$ with the supplemental air-chamber F at suitable intervals or distances from each other and thus admits of the fullest extent of compression, as clearly shown by dotted lines in Fig. 5 of the drawings.

The body B of the hollow tire, besides the cavity C and the bow-shaped arched base $g$, has upper rounded cheek-sections $d\ d$ upon each side of said cavity and also ring-shaped side channels $f$, of semicircular cross-section, which are located between the cheek-sections $d$ and the base-rim beads $g'$ thereof, the said side channels not only providing a reduced neck-shaped area of cross-section, which insures a high degree of elasticity, and, together with the hollow chamber $b$, connecting channels $l$ and auxiliary air-chamber F, will allow the said tire to be compressed to the position shown by dotted lines in Fig. 5, in which position the said side channels will be compressed until the point $m$ will rest tightly on the flange $h$ of the rim and provide closed auxiliary side air-compression chambers $f'$, which will thus give to the tire the fullest advantage of elasticity and resiliency.

The elasticity and wedge-shaped cross-section of the rubber tread-ring will admit of the latter being compressed tightly into the cavity C of the tire from the position shown in Fig. 4 to that of Fig. 5 when an excessive load is placed upon the tire, thus taking a firmer hold upon the tire and spreading it to its limits of elasticity, the arch $g$ being pressed downward and the volume of air in the chamber F being reduced and correspondingly compressed.

Wheel-tires formed as above described possess the essential advantages of inflated pneumatic tires without their disadvantages and are not rendered unserviceable by punctures of the usual kind, are easily placed on the wheel-rim, and are retained in place thereon without other and special fastening. As the shape of the tire thus constructed changes continuously when the wheel is running, the dirt will not become fixed to the channeled portions of its surface.

I claim as my invention and desire to secure by Letters Patent—

1. A pneumatic body for wheel-rims comprising a hollow rubber ring having a bow-shaped arch-base adapted to fit over a sheet-metal wheel-rim and be held from spreading between rim-flanges into which the edges of the arched base are fitted, and outer side channels or ring-shaped depressions to provide supplemental air-compression channels upon each side of the tire, substantially as described.

2. A wheel-tire composed of a hollow rubber body having its outer surface grooved to receive a separate ring-rim and its inner surface arched and bow-shaped in cross-section to fit the rim-flanges of a sheet-metal wheel-rim and a rubber ring adapted to fit the groove in the outer surface of said tire-body, substantially as set forth.

3. A pneumatic tire for wheel-rims comprising a body having a central longitudinal case, and longitudinal recesses or depressions in its four sides, and a rubber ring arranged in the recess upon the outer side, substantially as described.

In testimony that I claim the foregoing as my invention I have signed my name in presence of two subscribing witnesses.

ADOLF GÜNTHER.

Witnesses:
 W. HAUPT,
 HENRY HASPER.